United States Patent [19]

Hari

[11] Patent Number: 4,602,961
[45] Date of Patent: Jul. 29, 1986

[54] PROCESS FOR PIGMENTING HIGH MOLECULAR WEIGHT ORGANIC MATERIAL

[75] Inventor: Stefan Hari, Villars-sur-Glâne, Switzerland

[73] Assignee: Ciba-Geigy Corporation, Ardsley, N.Y.

[21] Appl. No.: 648,190

[22] Filed: Sep. 7, 1984

[30] Foreign Application Priority Data

Sep. 14, 1983 [CH] Switzerland ............ 5008/83

[51] Int. Cl.⁴ ................................. C08J 3/20
[52] U.S. Cl. .................. 106/308 M; 524/94; 534/579; 534/580; 534/751
[58] Field of Search .......... 106/288 Q, 308 M, 308 Q, 106/23; 260/149; 534/579, 580, 751; 524/94

[56] References Cited

U.S. PATENT DOCUMENTS 4,400,319  8/1983  Hari et al. ............. 260/155

FOREIGN PATENT DOCUMENTS 600101  6/1934  Fed. Rep. of Germany .

Primary Examiner—Amelia B. Yarbrough
Attorney, Agent, or Firm—Luther A. R. Hall

[57] ABSTRACT

A process for pigmenting high molecular weight organic material, which comprises using, as pigment, a monoazo compound of the formula

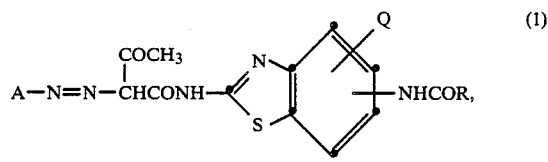

wherein A is a carbocyclic aromatic radical, R is an aliphatic, cycloaliphatic, araliphatic or aromatic radical or an alkoxy group, and Q is a hydrogen or a halogen atom or a methyl group.

The colorations obtained, for example in plastics, filaments, lacquers and prints, have very high color strength, high saturation, good dispersibility, good fastness to overspraying, migration, heat, light and atmospheric influences, and good gloss.

3 Claims, No Drawings

PROCESS FOR PIGMENTING HIGH MOLECULAR WEIGHT ORGANIC MATERIAL

The present invention relates to the pigmenting of high molecular weight organic material with monoazo compounds of the formula

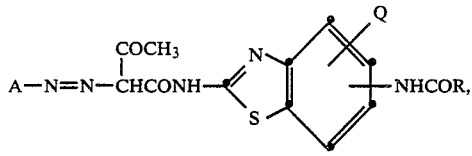 (1)

wherein A is a carbocyclic aromatic radical, R is an aliphatic, cycloaliphatic, araliphatic or aromatic radical or an alkoxy group, and Q is a hydrogen or halogen atom or a methyl group.

As a carbocyclic aromatic radical A can be for example a radical of the benzene, naphthalene, anthraquinone or pyrene series. These radicals may contain the following substituents: halogen atoms, for example chlorine, bromine or fluorine atoms; alkyl groups, preferably of 1 to 6 carbon atoms, in particular methyl groups, and alkoxy groups, preferably $C_1$–$C_6$alkoxy groups, for example methoxy, ethoxy or isopropoxy groups; and also aryloxy or aryloxycarbonyl groups, for example 1- or 2-naphthoxy groups, 1- or 2-naphthoxycarbonyl groups, but preferably phenoxy or phenoxycarbonyl groups which may be substituted in the phenyl moiety by halogen atoms, methyl or trifluoromethyl groups or by $C_2$–$C_6$alkoxycarbonyl groups; and further nitro, cyano or trifluoromethyl groups, alkoxycarbonyl groups, preferably of 2 to 6 carbon atoms, the alkyl moiety of which may contain halogen atoms; and sulfamoyl or carbamoyl groups which may be substituted at the N-atom by $C_1$–$C_6$alkyl groups or by phenyl or benzyl groups; or $C_1$–$C_6$alkylsulfonyl groups, arylsulfonyl groups, preferably phenylsulfonyl groups which are substituted by chlorine atoms or methyl groups; aroyl groups, preferably benzoyl groups which are unsubstituted or substituted by methyl groups; or $C_2$–$C_6$alkanoyl groups or $C_1$–$C_6$alkoxysulfonyl groups.

R is preferably an aliphatic or a cycloaliphatic radical, for example, a $C_2$–$C_{18}$alkyl group, preferably a $C_2$–$C_6$alkyl group, for example a methyl, propyl, isopropyl or butyl group. Typical examples of higher aliphatic radicals are the lauryl or stearyl group. R can also be an aralkyl radical for example a benzyl radical, or an aryl radical, in particular a radical of the benzene series, which can be substituted by halogen atoms, preferably chlorine atoms, or by methyl or phenyl groups. Suitable aryl radicals are for example the phenyl radical, the o-, m- or p-chlorophenyl radical, the o-, m- or p-methylphenyl radical, the diphenylyl radical and the 1- or 2-naphthyl radical. R can also be an alkoxy group, for example a methoxy, alkoxy, propoxy, isopropoxy or butoxy group.

Preferred monoazo compounds of the formula (1), wherein A is a radical of the benzene series, preferably a radical of the formula

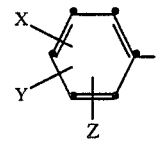 (2)

wherein X and Y are hydrogen or halogen atoms, nitro, cyano, carbamoyl or sulfamoyl groups, alkyl, alkoxy, alkylsulfonyl, alkoxycarbonyl, alkanoyl, alkoxysulfonyl or alkylsulfamoyl groups, each containing 1 to 6 carbon atoms, or phenoxy, phenylsulfonyl, phenoxycarbonyl, benzoyl or phenylsulfamoyl groups which are unsubstituted or substituted by halogen atoms, $C_1$–$C_4$alkyl, $C_1$–$C_4$alkoxy or trifluoromethyl groups, and Z is a hydrogen or halogen atom or a $C_1$–$C_4$alkyl group.

Particularly interesting monoazo compounds of the formula (1) are those wherein R is a phenyl radical which is unsubstituted or substituted by halogen atoms, nitro, $C_1$–$C_4$alkyl or $C_1$–$C_4$alkoxy groups, and preferably those wherein R is a $C_1$–$C_6$alkyl group.

A further group of compounds falling within the scope of the present invention comprises the compounds of the formula

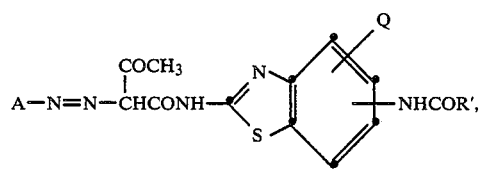 (3)

wherein A is a carbocyclic aromatic radical, R' is a $C_1$–$C_6$alkyl or $C_5$–$C_8$cycloalkyl radical and Q is a hydrogen or halogen atom or a methyl group.

Preferred compounds of the formula (3) are in turn those in which A is a radical of the benzene series, preferably a radical of the formula (2).

The monoazo compounds of the formulae (1) and (3) are obtained by coupling a diazotised carbocyclic aromatic amine with an acetoacetylaminobenzthiazole of the formula

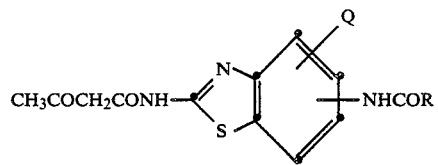 (4)

As amines, it is preferred to use aminobenzenes of the formula

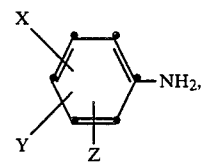 (5)

wherein X, Y and Z have the meanings assigned to them.

Representative examples of amines of the formula (5) are: anilines such as 2-, 3- or 4-chloroanilines, 3,4-dichloroaniline, 2,3-dichloroaniline, 2,4-dichloroaniline, 2,5-dichloroaniline, 2,6-dichloroaniline, 2,4,5-trichloroaniline, 2,4,6-trichloroaniline, 2-, 3- or 4-bromoaniline, 2,4-dibromoaniline, 2,5-dibromoaniline, 2-methyl-5-chloroaniline, 2-methyl-4-chloroaniline, 2-methyl-3-chloroaniline, 2-chloro-5-trifluoromethylaniline; alkylated anilines such as 2-, 3- or 4-methylaniline, 4-tert-butylaniline, 2,4-dimethylaniline; and nitroanilines, for example 2-, 3- or 4-nitroaniline, 4-chloro-2-nitroaniline, 2-chloro-4-nitroaniline, 4-methyl-3-nitroaniline, 2,4-dimethyl-3-nitroaniline, 2-methyl-5-nitroaniline, 2-methyl-4-nitroaniline; and alkoxyanilines and phenoxyanilines, for example 2- and 4-methoxyaniline, 2- and 4-ethoxyaniline, 3-chloro-4-methoxyaniline, 2-methoxy-5-nitroaniline, 2-methoxy-5-chloroaniline, 2-methoxy-5-trifluoromethylaniline, 2-amino-4-trifluoromethyl-4′-chlorodiphenyl ether, 2-nitro-4-ethoxyaniline, 2-methoxy-4-chloro-5-methylaniline, 2-amino-4-chlorodiphenyl ether, 2-amino-2′,4-dichlorodiphenyl ether, 2-amino-4,4′-dichlorodiphenyl ether, as well as aminobenzoates such as:
methyl, ethyl or isopropyl anthranilate
phenyl anthranilate
p-chlorophenyl anthranilate
p-methoxycarbonylphenyl anthranilate
methyl 1-amino-4-chloro-2-benzoate
methyl 1-amino-4-nitro-2-benzoate
methyl 1-amino-3-benzoate
phenyl 1-amino-3-benzoate
2′-diphenyl 1-amino-3-benzoate
methyl 1-amino-2-chloro-5-benzoate
phenyl 1-amino-2-chloro-4-benzoate
4′-diphenyl 1-amino-2-chloro-5-benzoate
4′-propoxycarbonylphenyl 1-amino-2-chloro-5-benzoate
phenyl 1-amino-2-methyl-3-benzoate
ethyl 1-amino-2-methyl-5-benzoate
propyl 1-amino-2-methyl-5-benzoate
isopropyl 1-amino-2-methyl-5-benzoate
β-chloroethyl 1-amino-2-methyl-5-benzoate
phenyl 1-amino-2-methyl-5-benzoate
o-, m- or p-methylphenyl 1-amino-2-methyl-5-benzoate
o-, m- or p-tert-octylphenyl 1-amino-2-methyl-5-benzoate
3′,5′-dimethylphenyl 1-amino-2-methyl-5-benzoate
4′-methoxycarbonylphenyl 1-amino-2-methyl-5-benzoate
4′-ethoxycarbonylphenyl 1-amino-2-methyl-5-benzoate
4′-propoxycarbonylphenyl 1-amino-2-methyl-5-benzoate
β-naphthyl 1-amino-2-methyl-5-benzoate
4′-isopropoxycarbonylphenyl 1-amino-2-methoxy-5-benzoate
dimethyl aminoterephthalate
diisopropyl aminoterephthalate
diphenyl aminoterephthalate,
and also aminobenzamides such as anthranilamide, methylanthranilamide, phenylanthranilamide, 1-amino-3-methylbenzamide, 1-amino-3-phenylbenzamide, 1-amino-2-chloro-5-benzamide, 1-amino-2-chloro-5-methylbenzamide, 1-amino-2-chloro-5-phenylbenzamide, 1-amino-2-methyl-5-benzamide, 1-amino-2-methyl-5-methylbenzamide, 1-amino-2-methyl-5-phenylbenzamide, α-naphthylamine, 1-aminoanthraquinone, 1-amino-3-chloroanthraquinone, 1-amino-4-benzoylaminoanthraquinone, 3-aminopyrene.

The acetoacetylaminobenzthiazoles of the formula (4) are obtained by reacting the appropriate 2-aminobenzthiazoles with diketene. Representative examples of acetoacetylaminobenzthiazoles are:
2-acetoacetylamino-6-acetylaminobenzthiazole
2-acetoacetylamino-6-propionylaminobenzthiazole
2-acetoacetylamino-6-butyrylaminobenzthiazole
2-acetoacetylamino-6-stearoylaminobenzthiazole
2-acetoacetylamino-6-phenacetylaminobenzthiazole
2-acetoacetylamino-6-isobutyrylaminobenzthiazole
2-acetoacetylamino-6-(2′-phenoxy)propionylaminobenzthiazole
2-acetoacetylamio-6-benzoylaminobenzthiazole
2-acetoacetylamino-6-p-methylbenzoylaminobenzthiazole
2-acetoacetylamino-6-o-chlorobenzoylaminobenzthiazole
2-acetoacetylamino-5-acetaminobenzthiazole
2-acetoacetylamino-5-phenacetylaminobenzthiazole
2-acetoacetylamino-5-benzoylaminobenzthiazole
2-acetoacetylamino-5-o-chlorobenzoylaminobenzthiazole
2-acetoacetylamino-4-acetylaminobenzthiazole
2-acetoacetylamino-4-benzoylaminobenzthiazole
2-acetoacetylamino-7-acetaminobenzthiazole
2-acetoacetylamino-7-benzoylaminobenzthiazole
2-acetoacetylamino-6-methoxycarbonylaminobenzthiazole.

The coupling of the diazotised amine with the acetoacetylaminobenzthiazoles is preferably carried out in weakly acidic medium, conveniently in the presence of a coupling promoter. Typical examples of coupling promoters are in particular dispersants, for example aralkylsulfonates such as dodecylbenzenesulfonate, or 1,1′-dinaphthylmethane-2,2′-disulfonic acid or polycondensates of alkylene oxides. The dispersion of the coupling component can also contain with advantage protective colloids, for example methyl cellulose, or smaller amounts of inert organic solvents which are sparingly soluble or insoluble in water, for example aromatic hydrocarbons or halogenated or nitrated aromatic hydrocarbons such as benzene, toluene, xylene, chlorobenzene, dichlorobenzene or nitrobenzene, as well as aliphatic halogenated hydrocarbons, for example carbon tetrachloride or trichloroethylene, and also water-miscible organic solvents such as acetone, methyl ethyl ketone, methanol, ethanol or isopropanol.

Finally, the coupling can also be carried out by suspending the diazo component, with the coupling component, in an organic solvent and treating the suspension with a diazotising agent, preferably an ester of nitric acid, for example methyl, ethyl, butyl, amyl or octyl nitrite.

The monoazo compounds of the formula (1) can also be obtained by condensing an aminoazo dye of the formula

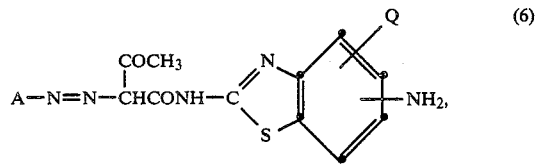

(6)

with an acid chloride of the formula RCOCl or an acid anhydride of the formula (RCO)₂O, wherein R has the meaning assigned to it. The aminoazo dyes of the formula (6) can be obtained from the corresponding nitroazo dyes by reduction.

The resultant pigments normally precipitate at elevated temperature and can be isolated in pure form by filtration and, if desired, by washing them with organic solvents. In general they have a good texture and can normally be used as crude products. If necessary or desired, however, the crude products can be converted into a finely dispersed form by grinding or kneading, advantageously using grinding assistants, such as inorganic and/or organic salts in the presence or absence of organic solvents. After the grinding procedure, the assistants are removed in the conventional manner: soluble inorganic salts for example with water, and water-insoluble assistants for example by steam distillation.

The properties of the crude pigments can often be improved by treating them with organic solvents, preferably those having a boiling point above 60° C. Particularly suitable organic solvents are: benzenes which are substituted by halogen atoms, alkyl or nitro groups, for example xylenes, chlorobenzene, o-dichlorobenzene or nitrobenzene, as well as pyridine bases such as pyridine, picoline or quinoline, and also ketones, for example cyclohexanone, methyl isobutyl ketone, acetylacetone; ethers, for example ethylene glycol monomethyl or monoethyl ether; amides such as dimethylformamide or N-methylpyrrolidone; acids such as formic acid or acetic acid; alcohols such as methyl alcohol, ethyl alcohol, propyl alcohol, isopropyl alcohol, isobutyl alcohol, mixtures of alcohol and water, and also dimethylsulfoxide or water, under pressure or without pressure.

The aftertreatment is effected preferably by heating the pigment in the solvent to 60° to 180° C., which leads in some cases to an increase in the granular size. The fastness to light and migration of the resultant pigments are thereby favourably influenced.

Depending on the end use requirement, it is advantageous to use the pigments as toners or in the form of preparations.

The high molecular weight organic material to be pigmented according to the invention may be of natural or synthetic origin. It may take the form, for example, of natural resins or drying oils, rubber or casein, or of modified natural substances such as chlorinated rubber, oil-modified alkyd resins, viscose, or of cellulose ethers and esters, for example cellulose acetate, cellulose propionate, cellulose acetobutyrate or nitrocellulose, and preferably of the man-made organic polymers (duroplasts and thermoplasts) obtained by polymerisation, polycondensation or polyaddition. Typical examples of materials belonging to the class of polymerisation resins are in particular: polyolefins such as polyethylene, polypropylene or polyisobutylene, and substituted polyolefins such as polymers of vinyl chloride, vinyl acetate, styrene, acrylonitrile, acrylic acid and/or methacrylates or butadiene, as well as copolymers of the above-mentioned monomers, in particular ABS or EVA.

Suitable examples of organic materials from the series of polyaddition salts and polycondensation resins are the condensates of formaldehyde with phenols (phenolic plastics), and the condensates of formaldehyde with urea, thiourea and melamine (aminoplasts), the polyesters employed as film-forming resins, namely both saturated resins such as alkyd resins, and unsaturated resins such as maleic resins, and also linear polyesters and polyamides or silicones.

The compounds of high molecular weight listed above can be employed singly or in admixture, as plastic masses or melts which can be spun to fibres.

They can also be in the form of their monomers or, in the polymerised state, in dissolved form as film formers or binders for lacquers or printing inks, e.g. boiled linseed oil, nitrocellulose, alkyd resins, melamine resins and urea/formaldehyde resins or acrylic resins.

The pigmenting of the high molecular weight organic substances with the pigments of the formula (1) is effected for example by mixing such a pigment, optionally in the form of a master-batch, with these substrates, using roll mills, mixing or grinding devices. The pigmented material is thereafter brought into the desired final form by known methods, such as calendering, pressing, extruding, coating, casting, or by injection moulding. It is often desirable to add plasticisers to the compounds of high molecular weight before forming them in order to obtain non-rigid moulded articles or to diminish their brittleness. Examples of such plasticisers are esters of phosphoric acid, phthalic acid or sebacic acid. The plasticisers can be added in the process of the invention before or after the incorporation of the pigment dye in the polyplastics. In order to obtain different shades it is also possible to add, in addition to the compounds of formula (1), fillers or other colouring constituents, such as white, coloured or black pigments, in any amounts to the organic substances.

For pigmenting lacquers and printing inks, the organic material of high molecular weight and the compounds of formula (1), optionally together with additives such as fillers, other pigments, siccatives or plasticisers, are finely dispersed or dissolved in a joint organic solvent or solvent mixture. The procedure can consist for example in dispersing or dissolving each of the components individually or also several jointly, and thereafter combining all the components.

The colorations obtained preferably contain 0.01 to 20% by weight of pigment, for example in plastics, filaments, lacquers and prints, and have very high colour strength, high saturation, good dispersibility, good fastness to overspraying, migration, heat, light and atmospheric influences, and also have good gloss and good IR reflectance.

The compounds of formula (1) can also be used as photoelectrophoretic toners.

The invention is illustrated by the following Examples in which parts and percentages are by weight, unless otherwise stated.

EXAMPLE 1

2,4 parts of 2,5-dichloroaniline are dissolved at room temperature in 17 parts by volume of glacial acetic acid. The brown solution is stirred in 3.9 parts of concentrated sulfuric acid and the thick suspension so obtained (chlorohydrate) is diluted with 8 parts of water and cooled to 5° C. Then 3.9 parts by volume of 4N sodium nitrite solution are added dropwise at 5° C. over 15 minutes and the brown diazo solution is clarified by filtration.

4.4 parts of 2-acetoacetylamino-6-acetaminobenzthiazole are dissolved in 11.3 parts by volume of 30% sodium hydroxide solution and 75 parts of water. The orange solution is filtered, cooled to 5° C. and the diazo solution is added dropwise over 20 minutes, during which addition an orange precipitate forms. The resultant suspension is adjusted to pH 5 by the slow addition of 12 parts by volume of 30% sodium hydroxide solution, stirred for 4 hours at a temperature rising to 23° C., heated to 75° C. over 1 hour and filtered hot with suction. The residue is washed free of salt and dried in vacuo at 80° C., affording 6.9 parts (99% of theory) of an orange powder of the formula

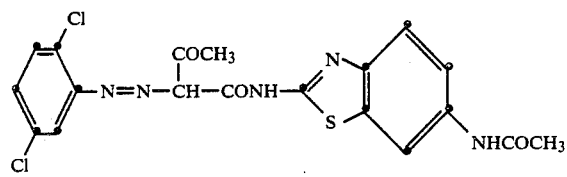

The pigment is subjected to an aftertreatment by heating it in 170 parts by volume of dimethylformamide at 147° C. for 2 hours. It colours polyvinyl chloride in a fast yellow shade.

The following table lists further pigments of this invention which are obtained by coupling the diazo compounds of the amines of column I with the acetoacetarylides of the amines of column II. Column III indicates the shade of PVC sheeting coloured with 0.2% of these pigments.

TABLE

| Ex. No. | I | II | III |
|---|---|---|---|
| 2 | 2,4,5-trichloroaniline | 2-amino-6-acetaminobenzthiazole | greenish yellow |
| 3 | 4-nitroaniline | 2-amino-6-acetaminobenzthiazole | orange |
| 4 | 2-chloro-5-trifluoromethylaniline | 2-amino-6-acetaminobenzthiazole | yellow |
| 5 | 2-chloro-5-nitroaniline | 2-amino-6-acetylaminobenzthiazole | greenish yellow |
| 6 | 2-amino-4-methoxybenzenesulfonamide | 2-amino-6-acetylaminobenzthiazole | greenish yellow |
| 7 | dimethyl-2-aminoterephthalate | 2-amino-6-acetylaminobenzthiazole | greenish yellow |
| 8 | 3-amino-4-chlorobenzamide | 2-amino-6-acetylaminobenzthiazole | yellow |
| 9 | 2-chloro-4-nitroaniline | 2-amino-6-acetylaminobenzthiazole | orange |
| 10 | ethyl-3-amino-4-chlorobenzoate | 2-amino-6-acetylaminobenzthiazole | yellow |
| 11 | 3-amino-4-methylbenzamide | 2-amino-6-acetylaminobenzthiazole | greenish yellow |
| 12 | 2-methyl-5-chloroaniline | 2-amino-6-acetylaminobenzthiazole | greenish yellow |
| 13 | 2-methoxy-5-chloroaniline | 2-amino-6-acetylaminobenzthiazole | yellow |
| 14 | ethyl-3-amino-4-methylbenzoate | 2-amino-6-acetylaminobenzthiazole | greenish yellow |
| 15 | ethyl-3-amino-4-methylbenzoate | 2-amino-6-acetylaminobenzthiazole | greenish yellow |
| 16 | 2-methoxy-5-nitroaniline | 2-amino-6-acetylaminobenzthiazole | greenish yellow |
| 17 | methyl-3-amino-4-methoxybenzoate | 2-amino-6-acetylaminobenzthiazole | yellow |
| 18 | methyl-3-amino-4-chlorobenzoate | 2-amino-6-acetylaminobenzthiazole | yellow |
| 19 | 2,5-dichloroaniline | 2-amino-6-phenacetylaminobenzthiazole | greenish yellow |
| 20 | 3-amino-4-methylbenzamide | 2-amino-6-phenacetylaminobenzthiazole | greenish yellow |
| 21 | 2,4,5-trichloroaniline | 2-amino-6-phenacetylaminobenzthiazole | yellow |
| 22 | 3-amino-4-chlorobenzamide | 2-amino-6-phenacetylaminobenzthiazole | greenish yellow |
| 23 | 2,5-dichloroaniline | 2-amino-6-cyclohexanoylaminobenzthiazole | greenish yellow |
| 24 | 3-amino-4-chlorobenzamide | 2-amino-6-cyclohexanoylaminobenzthiazole | yellow |
| 25 | 3-amino-4-methylbenzamide | 2-amino-6-cyclohexanoylaminobenzthiazole | greenish yellow |
| 26 | 3-amino-4-methoxybenzenesulfonamide | 2-amino-6-benzoylaminobenzthiazole | greenish yellow |
| 27 | 3-amino-4-chlorobenzamide | 2-amino-6-benzoylaminobenzthiazole | yellow |
| 28 | 3-amino-4-chlorobenzamide | 2-amino-6-(2'-chlorobenzoylamino)benzthiazole | yellow |
| 29 | 3-amino-4-methylbenzamide | 2-amino-6-ethoxycarbonylaminobenzthiazole | greenish yellow |
| 30 | 3-amino-4-chlorobenzamide | 2-amino-6-ethoxycarbonylaminobenzthiazole | greenish yellow |
| 31 | 3-amino-4-chlorobenzamide | 2-amino-6-crotonoylaminobenzthiazole | yellow |
| 32 | 3-amino-4-methylbenzamide | 2-amino-6-crotonoylaminobenzthiazole | greenish yellow |
| 33 | 3-amino-4-methylbenzamide | 2-amino-6-propionylaminobenzthiazole | greenish yellow |
| 34 | 2,5-dichloroaniline | 2-amino-5-acetylamino-6-methylbenzthiazole | greenish yellow |
| 35 | 3-amino-4-methylbenzamide | 2-amino-5-acetylamino-6-methylbenzthiazole | greenish yellow |
| 36 | 2,5-dichloroaniline | 2-amino-5-methyl-6-acetylaminobenzthiazole | yellow |
| 37 | 3-amino-4-methylbenzamide | 2-amino-5-methyl-6-acetylaminobenzthiazole | greenish yellow |
| 38 | 3-amino-4-chlorobenzamide | 2-amino-5-methyl-6-acetylaminobenzthiazole | yellow |
| 39 | 3-amino-4-methylbenzamide | 2-amino-5-chloro-6-acetylaminobenzthiazole | yellow |
| 40 | 3-amino-4-chlorobenzamide | 2-amino-5-chloro-6-acetylaminobenzthiazole | yellow |

Preparation of the starting materials (1) 2-Acetoacetylamino-6-acetylaminobenzthiazole (a) 2-Amino-6-acetylaminobenzthiazole A suspension of 75.1 parts of p-aminoacetanilide and 81 parts of sodium thiocyanate in 750 parts by volume of acetic acid is cooled to 9° C. and then a solution of 25.8 parts of bromine in 125 parts by volume of acetic acid is added dropwise over 1 hour. Despite cooling, the temperature rises to 14° C. The reaction mixture is stirred for 3 hours without cooling and the temperature rises to 20° C. The thick, pale beige suspension is filtered with suction and the filter cake is washed with 200 parts by volume of acetic acid, thoroughly pressed and dissolved in 1000 parts of water of 60° C. The turbid brown solution is filtered and the filtrate is cooled to 20° C. and adjusted to pH 7 with about 400 parts by volume of 25% ammonia solution. The pale yellow precipitate is finally isolated by filtration and dried in vacuo at 80° C., affording 87 parts (83% of theory) of a pale yellow powder with a melting point of 228°–229° C.

(b) 2-acetoacetylamino-6-acetylaminobenzthiazole 78 parts of 2-amino-6-acetylaminobenzthiazole in 150 parts by volume of acetic acid are heated to 63° C. and 41 parts of diketene are added dropwise to the ochre-yellow solution over 15 minutes. The temperature rises temporarily to 96° C. during this addition. The reaction mixture is stirred for 2½ hours at 80° C. and a dense precipitate forms after ½ hour. The batch is cooled to 29° C. and diluted with 300 parts of distilled water. The thick, pale grey suspension is stirred for 2 hours at a temperature which falls to 24° C. and filtered. The product is washed with 500 parts of water and dried in vacuo at 80° C., affording 83 parts (75% of theory) of pale grey powder with a melting point of 248°–250° C.

Analysis: calculated: C: 53.60, H: 4.50, N: 14.43, S: 11.01%, found: C: 53.2, H: 4.5, N: 14.5, S: 11.0%.

Most of the coupling components are prepared by this method.

(2) 2-Acetoacetylamino-6-benzoylaminobenzthiazole (a) 2-Amino-6-benzoylaminobenzthiazole 11.6 parts of benzoyl chloride are added very slowly dropwise over 1 hour to a suspension of 16.5 parts of 2,6-diaminobenzthiazole in 100 parts by volume of benzene and 13.9 parts of triethylamine. The reaction mixture is heated to 80° C. over 1 hour, then cooled to 20° C. and filtered with suction. The filter cake is is suspended in a mixer in 200 parts of water and the suspension is filtered with suction and dried in vacuo at 60° C., affording 25.5 parts (95% of theory) of a yellow powder which melts at 213°–215° C.

Analysis: calculated: C: 62.44, H: 4.12, N: 15.60, S: 11.90%, found: C: 62.1, H: 4.2, N: 15.5, S: 11.6%.

(b) 2-Acetoacetylamino-6-benzoylaminobenzthiazole

The procedure is the same as that described for the preparation of 2-acetoacetylamino-6-acetylaminobenzthiazole. Yield: 76% of theory. The white powder melts unsharp at 190°–198° C.

Analysis: calculated: C: 61.18, H: 4.28, N: 11.89, S: 9.07%, found: C: 61.4, H: 4.3, N: 11.8, S: 8.9%.

(3) 2-Acetylamino-5-acetylamino-6-methylbenzthiazole (a) 2-Acetoacetylamino-5-nitro-6-methylbenzthiazole Obtained by reaction of 2-amino-5-nitro-6-methylbenzthiazole with diketene in acetic acid. Yield: 94% of theory. The pale yellow powder melts at 201°–203° C.

Analysis: calculated: C: 49.14, H: 3.78, N: 14.33, S: 10.93%, found: C: 49.2, H: 3.8, N: 14.4, S: 11.0%.

(b) 2-Acetoacetylamino-5-amino-6-methylbenzthiazole

Obtained from the nitro compound by catalytic hydrogenation with Raney nickel in dioxan. Yield: 75% of theory. The beige-coloured powder melts at 200°–202° C.

Analysis: calculated: C: 54.74, H: 4.98, N: 15.96, S: 12.18%, found: C: 54.4, H: 5.1, N: 15.7, S: 11.8%.

(c) 2-Acetacetylamino-5-acetylamino-6-methylbenzthiazole

Obtained from the amine with acetyl chloride in chlorobenzene/pyridine (10:1). Yield 74% of theory. The pale yellow product melts at 220°–222° C.

Analysis: calculated: C: 55.07, H: 4.95, N: 13.76, S: 10.50%, found: C: 55.3, H: 4.9, N: 14.0, S: 10.8%.

EXAMPLE 41

The pigment prepared according to Example 1 is isolated as moist filter cake. 30 parts of this product are stirred in 200 parts by volume of 50% alcohol, then stirred in an autoclave for 3 hours at 170° C., cooled to 20° C. and filtered with suction. The product has the same properties regarding shade, fastness properties and behaviour as the pigment of Example 1.

EXAMPLES 42–76

Following the procedure of Example 41, the moist filter cake of Example 1 can also be treated under other conditions. The products so obtained differ in their properties. In the following table, column I indicates the solvent, column II the temperature and column III the treatment time.

| Ex. No. | I | II (°C.) | III |
|---|---|---|---|
| 42 | water | 95° | 30 min |
| 43 | water | 130° | 3 hr |
| 44 | methyl alcohol | 60° | 16 hr |
| 45 | ethyl acetate | 68° | 16 hr |
| 46 | ethyl alcohol | 80° | 16 hr |
| 47 | isopropyl alcohol | 82° | 16 hr |
| 48 | methyl isobutyl ketone | 86° | 16 hr |
| 49 | propyl alcohol | 92° | 16 hr |
| 50 | isobutyl alcohol | 95° | 16 hr |
| 51 | butyl alcohol | 99° | 16 hr |
| 52 | water | 150° | 3 hr |
| 53 | 50% methyl alcohol | 130° | 3 hr |
| 54 | 50% ethyl alcohol | 130° | 3 hr |
| 55 | 50% isopropyl alcohol | 130° | 3 hr |
| 56 | 50% propyl alcohol | 130° | 3 hr |
| 57 | 50% isobutyl alcohol | 130° | 3 hr |
| 58 | 50% butyl alcohol | 130° | 3 hr |
| 59 | 50% methyl alcohol | 150° | 3 hr |
| 60 | 10% ethyl alcohol | 150° | 3 hr |
| 61 | 10% isopropyl alcohol | 150° | 3 hr |
| 62 | 10% isobutyl alcohol | 150° | 3 hr |
| 63 | 10% propyl alcohol | 150° | 3 hr |
| 64 | 50% methyl alcohol | 150° | 3 hr |
| 65 | water | 180° | 3 hr |
| 66 | 10% butyl alcohol | 150° | 3 hr |
| 67 | 10% methyl alcohol | 160° | 3 hr |
| 68 | 10% methyl alcohol | 170° | 3 hr |
| 69 | 10% ethyl alcohol | 170° | 3 hr |
| 70 | 10% methyl alcohol | 180° | 3 hr |
| 71 | 50% methyl alcohol | 170° | 3 hr |
| 72 | 50% isopropyl alcohol | 170° | 3 hr |
| 73 | 50% isobutyl alcohol | 170° | 3 hr |
| 74 | 50% butyl alcohol | 170° | 3 hr |
| 75 | 50% propyl alcohol | 170° | 3 hr |
| 76 | 50% methyl alcohol | 180° | 3 hr |

In this table, the crystalline size of the pigment of Example 1 becomes increasingly larger in each successive Example. The colour strength accordingly diminishes but the weatherfastness increases.

EXAMPLE 77

30 parts of the moist filter cake obtained in Example 1 are heated to 178° C. in 200 parts of o-dichlorobenzene over 2 hours. The mixture of water and o-dichlorobenzene is distilled off as an azeotrope at 100° C. When no more water is detectable in the distillate, the orange suspension is cooled to 80° C. and filtered. The filter cake is washed with o-dichlorobenztene and 60% methanol and dried in vacuo at 60° C. The product colours PVC in fast, yellow shades.

EXAMPLE 78

4.2 parts of the aminoazo dye of the formula

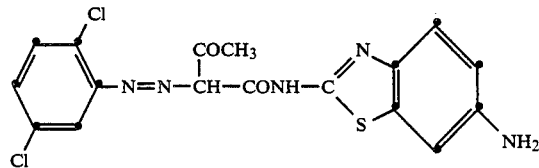

are heated to 156° C. in 150 parts by volume of o-dichlorobenzene. To the dark brown solution is added, at this temperature and over 1 minute, a solution of 1.2 parts of acetic anhydride in 50 parts by volume of o-dichlorobenzene. An orange precipitate forms after about 2 minutes. The suspension is stirred for 30 minutes at 160° C., then cooled to 82° C. and filtered hot. The filter cake is washed with o-dichlorobenzene and 60% methanol and dried, affording 4.3 parts (91% of theory) of an orange powder of the formula

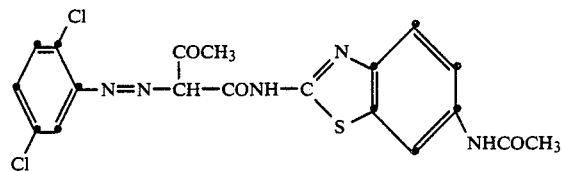

This product is identical with the pigment of Example 1.

Preparation of the aminoazo dye (a) 2-Acetoacetylamino-6-nitrobenzthiazole

Obtained by reaction of 2-amino-6-nitrobenzthiazole with diketene in acetic acid. Yield: 93% of theory. The white powder melts at 246°-248° C.

Analysis: calculated: C: 47.31, H: 3.25, N: 15.05, S: 11.48%, found: C: 47.2, H: 3.2, N: 15.2, S: 11.5%.

(b) Nitroazo dye of the formula

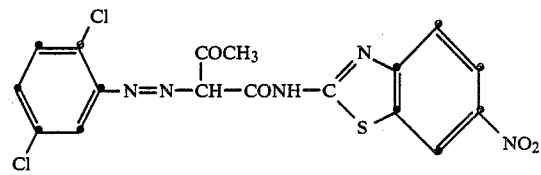

Prepared from 2-acetoacetylamino-6-nitrobenzthiazole and diazotised 2,5-dichloroaniline. Yield 84% of theory. The brown product has a melting point above 300° C.

Analysis: calculated: C: 45.15, H: 2.45, Cl: 15.68, N: 15.49, S: 7.09%, found: C: 45.2, H: 2.7, Cl: 15.2, N: 15.2, S: 7.1%.

(c) Aminoazo dye

Obtained from the corresponding nitroazo dye by catalytic reduction with Raney nickel in dimethylformamide. Yield: 73% of theory. The reddish brown powder melts at 272°-275° C. (dec.).

Analysis: calculated: C: 48.35, H: 3.10, Cl: 16.79, N: 16.58, S: 7.59%, found: C: 48.0, H: 3.2, Cl: 16.3, N: 16.3, S: 7.5%.

EXAMPLE 79: (plasticised vinyl chloride)

0.6 g of the pigment obtained in Example 1 is mixed with 67 g of polyvinyl chloride, 33 g of dioctyl phthalate, 2 g of dibutyl tin dilaurate and 2 g of titanium dioxide and the mixture is processed to a thin sheet for 15 minutes at 160° C. on a roll mill. The yellow coloration obtained is strong and fast to migration and light.

EXAMPLE 80: (Urea/formaldehyde resin)

100 parts of a powdered formaldehyde/urea resin suitable for moulding compounds, 10 parts of lithopone and 1 part of the pigment prepared according to Example 1 are ground for 16 hours in a ball mill. The plastic mass is then pressed in moulds at 140°-160° C. The yellow mouldings have good fastness to light and heat.

EXAMPLE 81: (Urea/formaldehyde lacquer)

15 parts of collodion cotton containing 35% of butanol, 15 g parts of a phthalate resin modified with castor oil, 15 parts of a 70% butanolic solution of a urea varnish gum, 20 parts of butyl acetate, 10 parts of glycol monoethyl ether, 20 parts of toluene and 5 parts of alcohol are processed to a lacquer. This lacquer is then pigmented with 2 parts of the pigment of Example 1 and 2 parts of titanium dioxide (rutile) and ground. The lacquer is sprayed onto carboard and dried, giving a yellow coating of very good fastness to light and overspraying and very good resistance to atmospheric influences.

EXAMPLE 82: (Alkyd/melamine stoving varnish)

60 parts of a 60% solution of a non-drying alkyd resin in xylene (registered trademark Beckosol ® 27-320, available from Reichhold-Albert-Chemie), 36 parts of a 50% solution of a melamine/formaldehyde resin in a mixture of alcohol/aromatics) (registered trademark Super-Beckamin ® 13-501, available from Reichhold-Albert-Chemie), 2 parts of xylene and 2 parts of methyl cellosolve are mixed, and 100 parts of the mixture are stirred to a homogeneous varnish solution. 95 parts of the clear varnish so obtained and 5 parts of the pigment obtained in Example 1 are ground for 72 hours in a ball mill. The coloured varnish is then applied to metal by a conventional spraying method and stoved for 30 minutes at 120° C. A yellow finish of good lightfastness is obtained.

EXAMPLE 83: (Acrylic/melamine stoving varnish)

41.3 parts of a 60% solution of an acrylic resin in xylene (registered trademark Viacryl ® VC 373, available from Vianova), 16.3 parts of a 55% solution of a melamine/formaldehyde resin in butanol (registered trademark Maprenal ® TTX, available from Bayer), 32.8 parts of xylene, 4.6 parts of ethyl glycol acetate, 2 parts of cyclohexanone, 2 parts of butyl acetate and 1 part of silicone oil A (1% in xylene, available from Bayer), are stirred to a homogeneous varnish solution. 95 parts of the clear varnish so obtained and 5 parts of the pigment obtained in Example 1 are ground for 72 hours in a ball mill. The coloured varnish is then applied to metal by a conventional spraying method and stoved for 30 minutes at 120° C. A yellow finish of good lightfastness is obtained.

What is claimed is:

1. A monoazo pigment of the formula

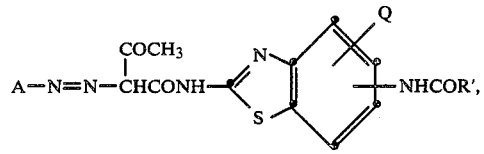

wherein A is a radical of the formula

(2)

X and Y are hydrogen or halogen atoms, nitro, cyano, carbamoyl or sulfamoyl groups; alkyl, alkoxy, alkylsulfonyl, alkoxycarbonyl, alkanoyl, alkoxysulfonyl or alkylsulfamoyl groups, each containing 1 to 6 carbon atoms, phenoxy, phenylsulfonyl, phenoxycarbonyl, benzoyl or phenylsulfamoyl groups which are unsubstituted or substituted by halogen atoms, $C_1$-$C_4$alkyl, $C_1$-$C_4$alkoxy or trifluoromethyl groups, and Z is a hydrogen or halogen atom or a $C_1$-$C_4$alkyl group, R' is a $C_1$-$C_6$alkyl group or a $C_5$-$C_8$cycloalkyl group and Q is a hydrogen or halogen atom or a methyl group.

2. A process for pigmenting high molecular weight organic polymers selected from the group consisting of polyolefins; polymers of vinyl chloride, of vinyl acetate, of styrene, of acrylonitrile, of acrylic acid, of methacrylates, of butadiene or of copolymers of these monomers; condensates of formaldehyde with phenols, with urea, with thiourea or with melamine; polyesters; polyamides and silicones, which comprises using, as pigment, as monoazo compound of the formula

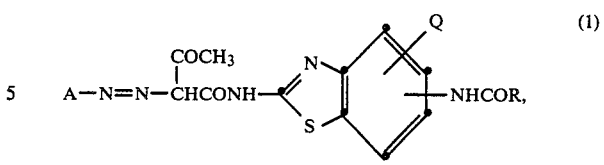

wherein A is a radical of the formula

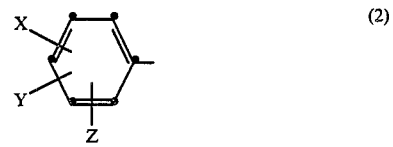

X and Y are hydrogen or halogen atoms, nitro, cyano, carbamoyl or sulfamoyl groups; alkyl, alkoxy, alkylsulfonyl, alkoxycarbonyl, alkanoyl, alkoxysulfonyl or alkylsulfamoyl groups, each containing 1 to 6 carbon atoms, phenoxy, phenylsulfonyl, phenoxycarbonyl, benzoyl or phenylsulfamoyl groups which are unsubstituted or substituted by halogen atoms, $C_1$-$C_4$alkyl, $C_1$-$C_4$alkoxy or trifluoromethyl groups, and Z is a hydrogen or halogen atom or a $C_1$-$C_4$alkyl group, R is an aliphatic or cycloaliphatic radical or an alkoxy group, and Q is a hydrogen or halogen atom or a methyl group.

3. A process according to claim 2, wherein R is a $C_1$-$C_6$alkyl group.